(12) United States Patent
Ballinger et al.

(10) Patent No.: US 6,527,663 B2
(45) Date of Patent: Mar. 4, 2003

(54) PINION SHAFT FOR DIFFERENTIAL ASSEMBLY

(75) Inventors: Patrick Ballinger, Fort Wayne, IN (US); Mark Barnholt, Fort Wayne, IN (US); Ben Passino, Fort Wayne, IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 0 days.

(21) Appl. No.: 09/870,768

(22) Filed: Jun. 1, 2001

(65) Prior Publication Data

US 2002/0183157 A1 Dec. 5, 2002

(51) Int. Cl.[7] .......................... F16H 48/08; F16H 57/00
(52) U.S. Cl. .................. 475/230; 475/331; 475/336
(58) Field of Search .................. 475/220, 230, 475/331, 336

(56) References Cited

U.S. PATENT DOCUMENTS

| | | | | |
|---|---|---|---|---|
| 1,508,832 A | * | 9/1924 | Zimmerschied et al. | 475/230 |
| 1,616,627 A | | 2/1927 | Hunt | 475/230 |
| 1,641,190 A | | 9/1927 | Morgan | |
| 1,895,384 A | | 1/1933 | Lorimor | 475/230 |
| 3,974,717 A | * | 8/1976 | Breed et al. | 475/230 |
| 4,136,582 A | | 1/1979 | Boor | 475/230 |
| 4,183,263 A | * | 1/1980 | Osenbaugh | 475/230 |
| 5,624,343 A | * | 4/1997 | Krisher | 475/230 |
| 6,176,178 B1 | * | 1/2001 | Schor et al. | 101/91 |

FOREIGN PATENT DOCUMENTS

| JP | 9-53419 | * | 2/1997 | F01L/1/46 |
|---|---|---|---|---|

* cited by examiner

Primary Examiner—Sherry Estremsky
(74) Attorney, Agent, or Firm—Liniak, Berenato & White

(57) ABSTRACT

A novel arrangement of a pinion shaft for a differential assembly having a substantially H-shaped cross-section with added oiling radii. The H-shaped pinion shaft provides substantially reduced weight of the differential pinion shaft, increases a strength-to-weight ratio, and improves lubrication.

22 Claims, 4 Drawing Sheets

PINION SHAFT FOR DIFFERENTIAL ASSEMBLY

BACKGROUND OF THE INVENTION

1. Field of the Invention

The present invention relates to a differential assembly, and more particularly to a pinion shaft for the differential assembly for motor vehicles, having an H-shaped cross-section.

2. Description of the Prior Art

Conventionally, differential assemblies well known in the prior art, are arranged in a power transmission system of a motor vehicle to allow a pair of output shafts operatively coupled to an input shaft to rotate at different speeds, thereby allowing the wheel associated with each output shaft to maintain traction with the road while the vehicle is turning. Such a device essentially distributes the torque provided by the input shaft between the output shafts.

Essential part of the differential assembly is a pinion shaft rotatably supporting differential pinion mate gears in mesh with side gears that are, in turn, drivingly coupled to the output shafts of the motor vehicle. Usually, the pinion shafts of the differential assemblies are cylindrically shaped and have a circular cross-section. Some pinion shafts, known in the prior art, have flattened portions for improving lubrication.

SUMMARY OF THE INVENTION

The present invention provides a novel arrangement of a pinion shaft of a differential assembly for motor vehicles.

In accordance with the present invention, at least a section of the differential pinion shaft that supports a pinion mate gear member, has a substantially H-shaped cross-section with added oiling radii.

In accordance with the first embodiment of the present invention, an entire length of the pinion shaft has a substantially H-shaped (or I-shaped) cross-section having a substantially uniform size in a lengthwise direction thereof.

In accordance with the second embodiment of the present invention, the pinion shaft has opposite end sections and a central section. The entire length of the pinion shaft has a substantially H-shaped cross-section, wherein said H-shaped cross-section of said end sections has substantially uniform size across an entire length thereof and said H-shaped cross-section of said central section has a substantially varied size across an entire length thereof.

In accordance with the third embodiment of the present invention, the pinion shaft has opposite end sections adapted to engage a differential case and a central section rotatably supporting the pinion mate gears, wherein the end sections are substantially cylindrical, while the central section has essentially H-shaped cross-section having a substantially uniform size across an entire length thereof.

In accordance with the third embodiment of the present invention, the pinion shaft has opposite end sections adapted to engage the differential case and the central section rotatably supporting the pinion mate gears, wherein the end sections are substantially cylindrical, while the central section has essentially H-shaped cross-section having a substantially constant area in a lengthwise direction thereof.

In accordance with the forth embodiment of the present invention, the pinion shaft has opposite end sections adapted to engage the differential case and the central section rotatably supporting the pinion mate gears, wherein the end sections are substantially cylindrical, while the central section has essentially H-shaped cross-section. The central section, in turn, has a pair of opposite gear bearing segments interconnected by a link segment. The H-shaped cross-section of the gear bearing segments has a substantially uniform size across an entire length thereof and the H-shaped cross-section of the link segment has a substantially varied size across an entire length thereof. The differential pinion shaft in accordance with the present invention represents an improvement over the prior art that substantially reduces weight of the differential pinion shaft, increases a strength-to-weight ratio, and improves lubrication.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
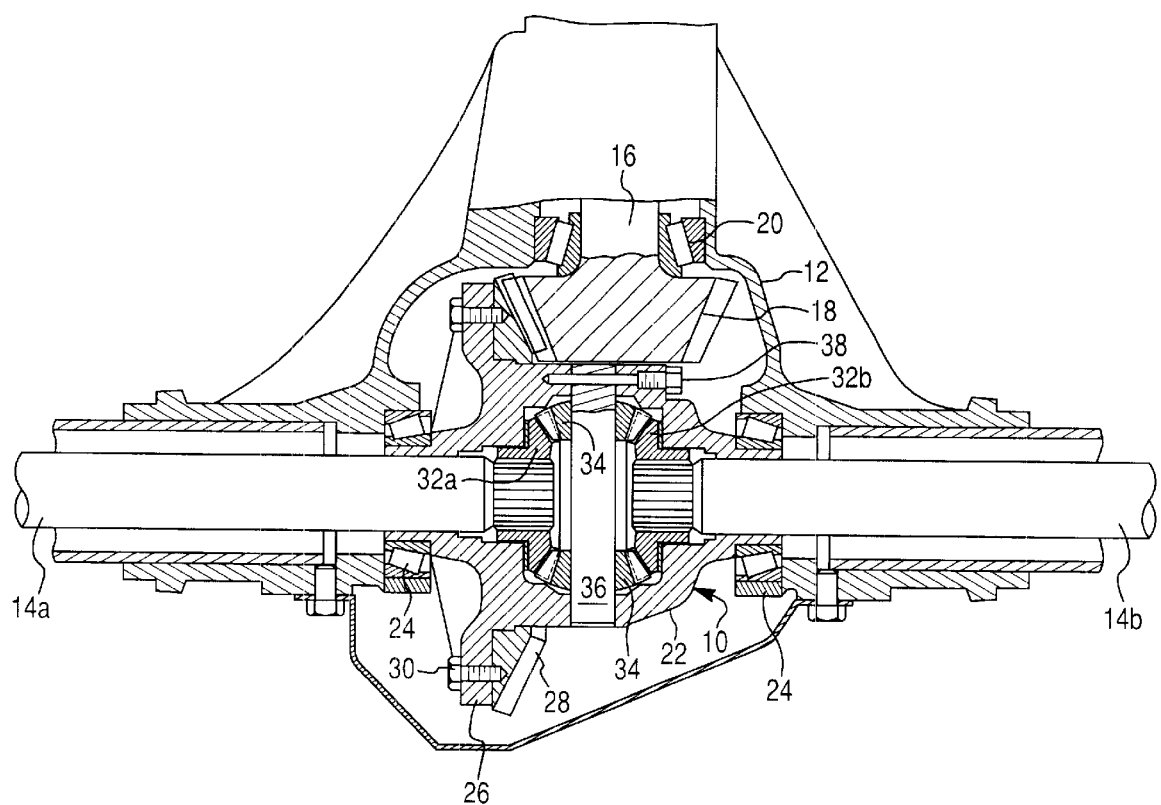
FIG. 1 is a partial cross-sectional view of a differential assembly.

Referring now to FIG. 1 of the drawings, a typical differential assembly for a motor vehicle, generally designated by the reference numeral 10, is illustrated. The differential assembly 10 is incased in an axle housing 12, and is adapted to differentially drive a pair of aligned axle shafts 14*a* and 14*b* projecting inwardly of the differential assembly 10 from the opposite directions and, in turn is driven by a drive pinion shaft 16 provided with a drive gear 18 at one end thereof. The drive pinion shaft 16 is mounted for rotation adjacent to the differential assembly 10 as by means of a bearing 20 in the axle housing 12.

The differential assembly 10 comprises a differential case 22 rotatably supported at opposite ends thereof by means of a pair of opposite tapered roller side bearings 24 in the axle housing 12. The differential case 22 has an annular flange 26 to which a ring gear 28 is fastened by any appropriate means, such as by bolts 30. The ring gear 28 meshes with the drive gear 18.

The differential case 22 houses a pair of opposite side gears 32*a* and 32*b* commonly splined to the axle shafts 14*a* and 14*b* for rotation therewith, and a set of pinion mate gear members 34 rotatably supported on a transverse pinion shaft 36. The side gears 32a and 32b are in mesh with the pinion mate gear members 34. The pinion shaft 36 is conventionally retained within the differential case 22 by a locking pin 38 extending through an opening in the pinion shaft 36.

Typically, the pinion shaft 36 of the prior art has substantially cylindrical outer peripheral surface, i.e. the pinion shaft has a substantially circular cross-section.

Figure 2:
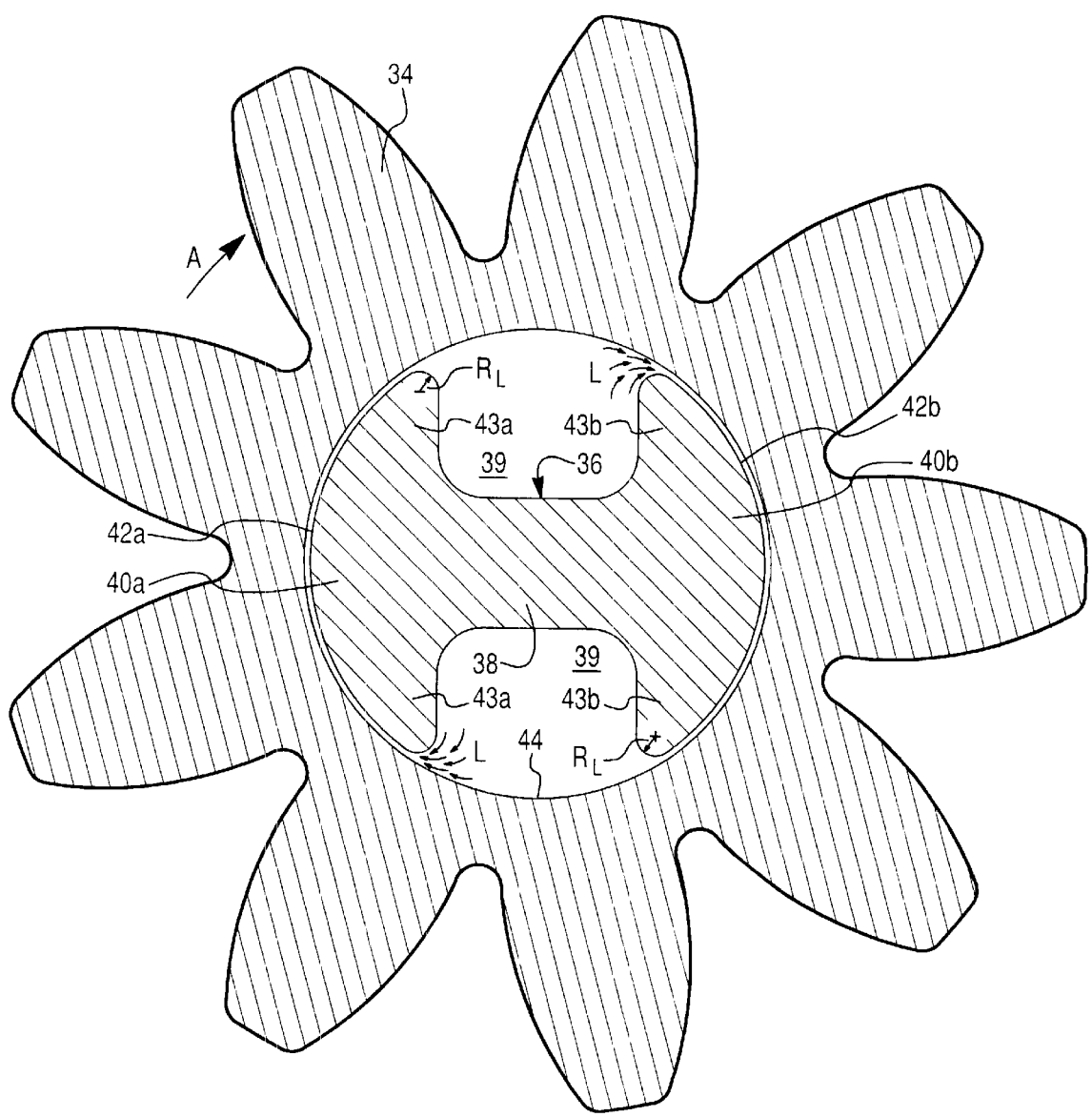
FIG. 2 is a cross-sectional view of a pinion shaft in accordance with the present invention disposed in a bore of a pinion mate gear member of the differential assembly.

By contrast, in accordance with the present invention, at least a portion of the pinion shaft 36 supporting the pinion mate gear members 34, has substantially H-shaped (or I-shaped) cross-section. The H-shaped portion of the pinion shaft 36 includes a web element 38 interconnecting opposite flange members 40a and 40b, as illustrated in FIG. 2, thus defining opposite channels 39 separated by the web element 38. The flange members 40a and 40b have curved outer peripheral surfaces 42a and 42b, respectively, complementary to an inner peripheral surface of a bore 44 in the pinion mate gear member 34. In order to improve lubrication of bearing surfaces of the pinion shaft 36, distal ends 43a and 43b of the flange members 40a and 40b, respectively, are rounded off with oiling radii $R_L$. Arrows L in FIG. 2 illustrate a flow of lubricant oil when the pinion mate gear member 34 rotates in the direction of an arrow A relative to the pinion shaft 36.

Figure 3:
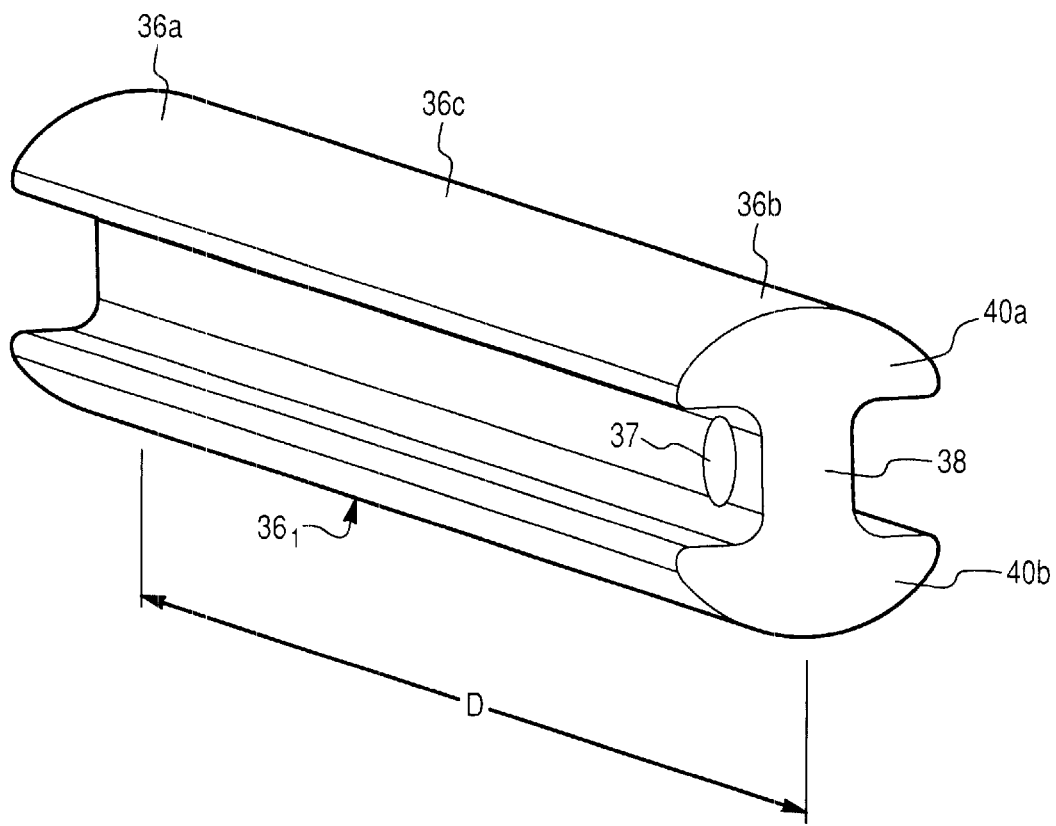
FIG. 3 is a perspective view of the pinion shaft in accordance with the first embodiment of the present invention.

In accordance with the first embodiment of the present invention, illustrated in FIG. 3, a pinion shaft 36, has a substantially H-shaped cross-section having a substantially uniform size across an entire length D thereof. Preferably, the pinion shaft $36_1$ made by a metal extrusion process. However, any other appropriate method for making the pinion shaft $36_1$, such as machining, forging or casting, is within the scope of the present invention.

The pinion shaft $36_1$ has opposite end sections 36a and 36b adapted to engage the differential case 22, and a central section 36c adapted to rotatably support the pinion mate gear members 34. The pinion shaft 36 further includes an opening 37 at one end section thereof (e.g. the end section 36b, as shown in FIG. 3) receiving the locking pin 38 for securing the pinion shaft $36_1$ to the differential case 22.

Figure 4:
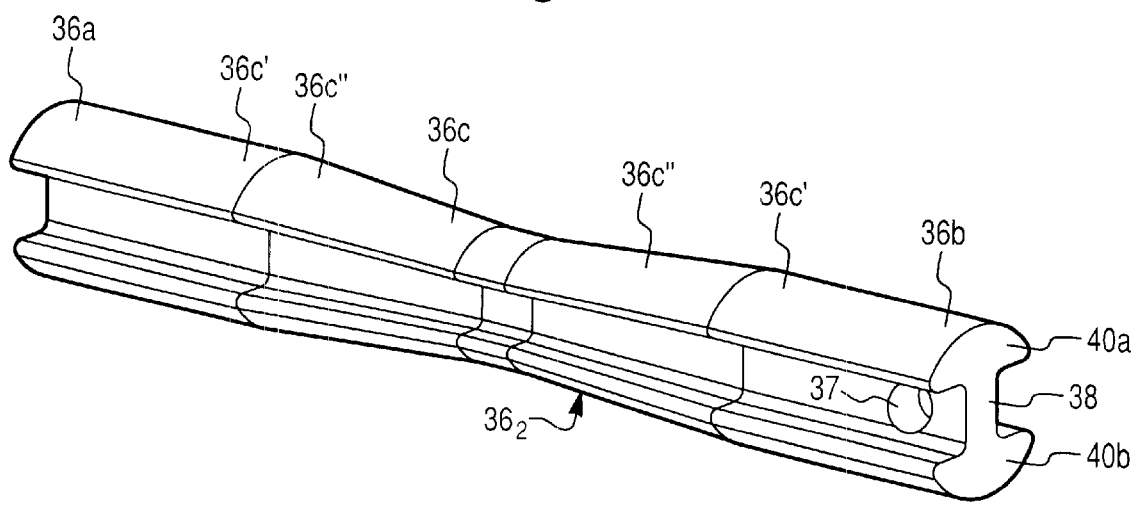
FIG. 4 is a perspective view of the pinion shaft in accordance with the second embodiment of the present invention.

The second embodiment shown in FIG. 4 comprises a number of parts corresponding to those used in the first embodiment, and they will be referenced by the same reference numerals used in the first embodiment, sometimes without describing in details since similarities between the corresponding parts in those embodiments will be readily perceived by the reader.

In accordance with the second embodiment of the present invention, a pinion shaft $36_2$ has essentially H-shaped cross-section across the entire length thereof. The end sections 36a and 36b have a substantially uniform size across the entire length thereof. The central section 36c includes a pair of opposite gear bearing segments 36c' of a substantially uniform size interconnected by substantially tapered segments 36c" having a varied size. Preferably, the pinion shaft $36_2$ is made by a metal forging. However, any other appropriate method for making the pinion shaft $36_2$, such as casting or machining, is within the scope of the present invention.

Figure 5:
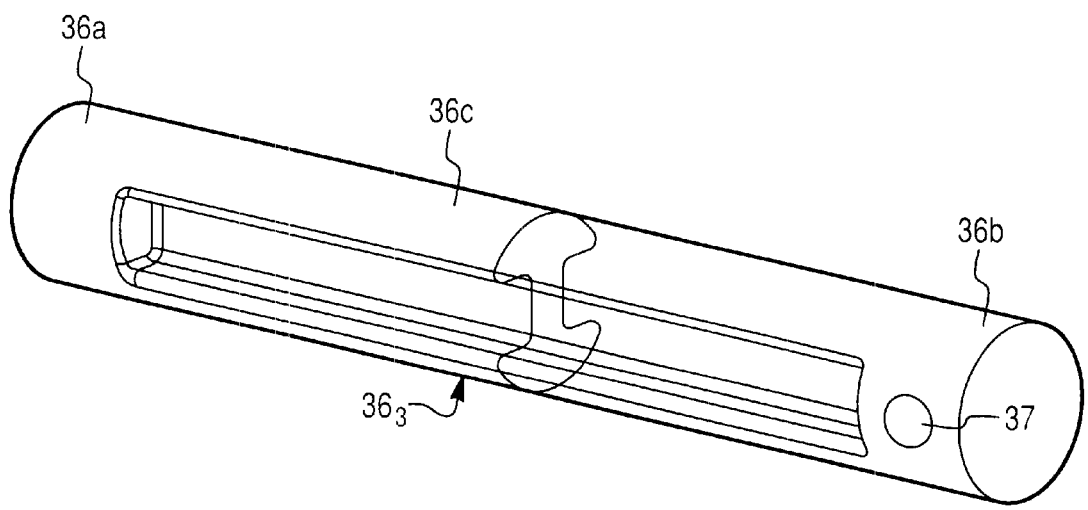
FIG. 5 is a perspective view of the pinion shaft in accordance with the third embodiment of the present invention.

The third embodiment of the present invention shown in FIG. 5 comprises a number of parts corresponding to those used in the first and second embodiments, and they will be referenced by the same reference numerals, sometimes without describing in details since similarities between the corresponding parts in those embodiments will be readily perceived by the reader.

In accordance with the third embodiment of the present invention, a pinion shaft $36_3$ has opposite end sections 36a and 36b adapted to engage the differential case 22, and a central section 36c rotatably supporting the pinion mate gear members 34, wherein the end sections 36a and 36b are substantially cylindrical, while the central section 36c has substantially H-shaped cross-section having a substantially uniform size across an entire length thereof.

Figure 6:
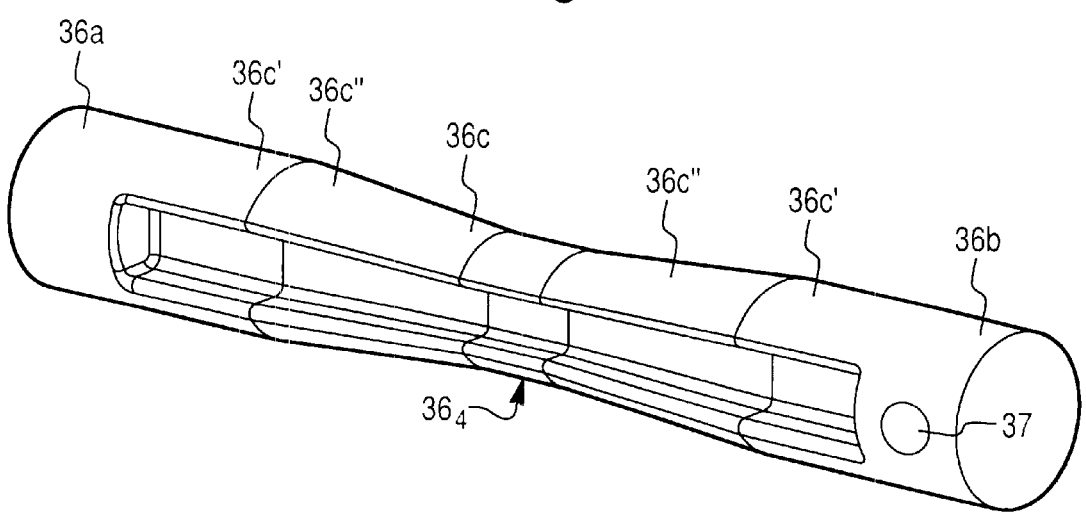
FIG. 6 is a perspective view of the pinion shaft in accordance with the forth embodiment of the present invention.

The forth embodiment of the present invention shown in FIG. 6 comprises a number of parts corresponding to those used in the previous embodiments, and they will be referenced by the same reference numerals, sometimes without describing in details since similarities between the corresponding parts in those embodiments will be readily perceived by the reader.

In accordance with the forth embodiment of the present invention, a pinion shaft $36_4$ has opposite end sections 36a and 36b adapted to engage the differential case 22, and a central section 36c rotatably supporting the pinion mate gear members 34, wherein the end sections 36a and 36b are substantially cylindrical, while the central section 36c has a substantially H-shaped cross-section having a substantially varied size in a lengthwise direction thereof. Moreover, the central section 36c includes a pair of opposite gear bearing segments 36c' of a substantially uniform size across an entire length thereof, interconnected by a link segment including substantially tapered segments 36c".

Therefore, the differential pinion shaft in accordance with the present invention represents an improvement over the prior art that substantially reduces weight of the differential pinion shaft (by as much as 35–40%), increases a strength-to-weight ratio by about 33%, and improves lubrication.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A shaft relatively rotatably disposed in a bore of at least one first member, said shaft having a length, wherein at least a portion of said length of said shaft within said bore of said first member has a substantially H-shaped cross-section, wherein said first member having said bore is a gear member.

2. The shaft as defined in claim 1, wherein said shaft is a differential pinion shaft and said gear member is a differential pinion mate gear.

3. The shaft as defined in claim 1, having said H-shaped cross-section across said entire length thereof.

4. The shaft as defined in claim 3, wherein said H-shaped cross-section is substantially uniform in size across said length of said shaft.

5. The shaft as defined in claim 3, wherein said H-shaped cross-section has substantially varied size across said length of said shaft.

6. The shaft as defined in claim 1, wherein said shaft has opposite end sections and a central section, said end sections are substantially cylindrical and said central section has said H-shaped cross-section having a substantially uniform size across an entire length thereof.

7. The shaft as defined in claim 1, wherein said shaft has opposite end sections and a central section, said end sections are substantially cylindrical and said central section has said H-shaped cross-section having a substantially varied size across an entire length thereof.

8. The shaft as defined in claim 1, wherein said H-shaped cross-section of said shaft includes a web element interconnecting opposite flange members, said flange members have curved outer peripheral surfaces substantially complementary to an inner peripheral surface of said bore in said first member.

9. The shaft as defined in claim 8, wherein distal ends of said flange members are rounded off.

10. A differential assembly comprising:
    a differential case;
    a pinion shaft secured to said differential case for rotation therewith;
    a set of spaced apart differential pinion mate gear members rotatably supported by said pinion shaft,
    wherein at least a section of said pinion shaft supporting said differential pinion mate gear members has a substantially H-shaped cross-section.

11. The differential assembly as defined in claim 10, wherein said H-shaped cross-section of said pinion shaft includes a web element interconnecting opposite flange members, said flange members have curved outer peripheral surfaces complementary to an inner peripheral surface of a bore in said pinion mate gear member.

12. The differential assembly as defined in claim 11, wherein distal ends of said flange members are rounded off.

13. The differential assembly as defined in claim 10, wherein said set of differential pinion mate gear members includes two differential pinion mate gear members rotatably disposed on opposite ends of said pinion shaft.

14. The differential assembly as defined in claim 10, wherein said pinion shaft has said H-shaped cross-section across an entire length thereof.

15. The differential assembly as defined in claim 14, wherein said H-shaped cross-section-has substantially uniform size across said entire length of said pinion shaft.

16. The differential assembly as defined in claim 14, wherein said H-shaped cross-section has a substantially varied size across said entire length of said pinion shaft.

17. The differential assembly as defined in claim 14, wherein said pinion shaft has opposite end sections for engaging said differential case and supporting said pinion mate gear members and a central section, said H-shaped cross-section of said end sections has substantially uniform size across an entire length thereof and said H-shaped cross-section of said central section has a substantially varied size across an entire length thereof.

18. The differential assembly as defined in claim 10, wherein said pinion shaft has opposite end sections for engaging said differential case and a central section for supporting said pinion mate gear members, said end sections are substantially cylindrical and said central section has a substantially H-shaped cross-section.

19. The differential assembly as defined in claim 18, wherein said H-shaped cross-section of said central section has a substantially uniform size across an entire length thereof.

20. The differential assembly as defined in claim 18, wherein said H-shaped cross-section of said central section has a substantially varied size across an entire length thereof.

21. The differential assembly as defined in claim 20, wherein said central section has a pair of opposite gear bearing segments interconnected by a link segment, said H-shaped cross-section of said gear bearing segments has a substantially uniform size across an entire length thereof and said H-shaped cross-section of said link segment has a substantially varied size across an entire length thereof.

22. A differential assembly comprising:
    a differential case;
    a pinion shaft secured to said differential case for rotation therewith; and
    a set of spaced apart differential pinion mate gear members rotatably supported by said pinion shaft;
    said pinion shaft having opposite end sections for engaging said differential case and a central section for supporting said pinion mate gear members, said end sections are substantially cylindrical and said central section has a substantially H-shaped cross-section;
    said central section has a pair of opposite gear bearing segments interconnected by a link segment, said H-shaped cross-section of said gear bearing segments has a substantially uniform size across an entire length thereof and said H-shaped cross-section of said link segment has a substantially varied size across an entire length thereof,
    wherein said H-shaped cross-section of said pinion shaft includes a web element interconnecting opposite flange members, said flange members have curved outer peripheral surfaces complementary to an inner peripheral surface of a bore in said pinion mate gear member, distal ends of said flange members are rounded off.

* * * * *